(12) United States Patent
Skudlarek et al.

(10) Patent No.: US 10,375,387 B2
(45) Date of Patent: Aug. 6, 2019

(54) VIDEO IMAGE RECORDING METHOD AND REPRODUCING METHOD

(71) Applicant: Panasonic Automotive & Industrial Systems Europe GmbH, Langen (DE)

(72) Inventors: Stefan Jan Skudlarek, Langen (DE); Mario Brotz, Langen (DE); Jun Imamura, Langen (DE); Mohamed Badran, Langen (DE)

(73) Assignee: PANASONIC AUTOMOTIVE & INDUSTRIAL SYSTEMS EUROPE GMBH, Langen (DE)

( * ) Notice: Subject to any disclaimer, the term of this patent is extended or adjusted under 35 U.S.C. 154(b) by 0 days.

(21) Appl. No.: 16/110,337

(22) Filed: Aug. 23, 2018

(65) Prior Publication Data

US 2019/0068963 A1    Feb. 28, 2019

(30) Foreign Application Priority Data

Aug. 25, 2017   (DE) .................. 10 2017 214 934

(51) Int. Cl.
*H04N 17/04*       (2006.01)
*G06F 11/36*       (2006.01)
(Continued)

(52) U.S. Cl.
CPC .............. *H04N 17/04* (2013.01); *B60R 1/00* (2013.01); *G06F 11/3664* (2013.01);
(Continued)

(58) Field of Classification Search
CPC .... H04N 17/04; H04N 5/23299; H04N 5/247; H04N 5/77; H04N 9/87; B60R 1/00; G06F 11/3664; G06F 11/3684; G06F 11/3688
See application file for complete search history.

(56) References Cited

U.S. PATENT DOCUMENTS

| | | |
|---|---|---|
| 5,343,288 A | 8/1994 | Cohen et al. |
| 6,437,759 B1 | 8/2002 | Turner et al. |
| | (Continued) | |

FOREIGN PATENT DOCUMENTS

| | | |
|---|---|---|
| DE | 102012010120 A1 | 11/2013 |
| DE | 102015008887 A1 | 3/2016 |
| | (Continued) | |

*Primary Examiner* — Thai Q Tran
*Assistant Examiner* — Sunghyoun Park
(74) *Attorney, Agent, or Firm* — The Webb Law Firm

(57) ABSTRACT

A method for optimizing a head-up display for the output of position-accurate additional AR information by means of a test vehicle and a test system is disclosed. The input data of the head-up display output from the vehicle bus for generating the additional AR information and video data, which include a view of the road (vehicle environment) as perceived by the driver, are recorded separately but temporally synchronized in the test vehicle. Information is generated that indicates a position where the output of the head-up display, thus, the additional AR information, is arranged in the driver's field of view. The recorded data is used for a corresponding reproduction in the test environment. This allows the head-up display software to be further developed without having to carry out test drives with the test vehicle every time the software is changed.

12 Claims, 8 Drawing Sheets

(51) Int. Cl.
  *B60R 1/00*      (2006.01)
  *H04N 5/247*    (2006.01)
  *H04N 5/77*      (2006.01)
  *H04N 5/232*    (2006.01)
  *H04N 9/87*      (2006.01)

(52) U.S. Cl.
  CPC ...... *G06F 11/3684* (2013.01); *G06F 11/3688* (2013.01); *H04N 5/23299* (2018.08); *H04N 5/247* (2013.01); *H04N 5/77* (2013.01); *H04N 9/87* (2013.01); *B60R 2300/107* (2013.01); *B60R 2300/205* (2013.01); *B60R 2300/303* (2013.01)

(56) References Cited

U.S. PATENT DOCUMENTS

| | | | |
|---|---|---|---|
| 2015/0274074 A1* | 10/2015 | Petrillo | B60R 1/00 701/36 |
| 2015/0353095 A1* | 12/2015 | Freess | B60C 9/00 701/41 |
| 2016/0377873 A1 | 12/2016 | Kimura | |
| 2017/0028917 A1* | 2/2017 | Tauchi | G08G 1/165 |
| 2017/0043720 A1* | 2/2017 | Shaw | B60Q 9/008 |
| 2017/0132925 A1* | 5/2017 | Behrens | G06K 9/00818 |

FOREIGN PATENT DOCUMENTS

| | | |
|---|---|---|
| WO | 0167422 A2 | 9/2001 |
| WO | 2013174501 A1 | 11/2013 |

* cited by examiner

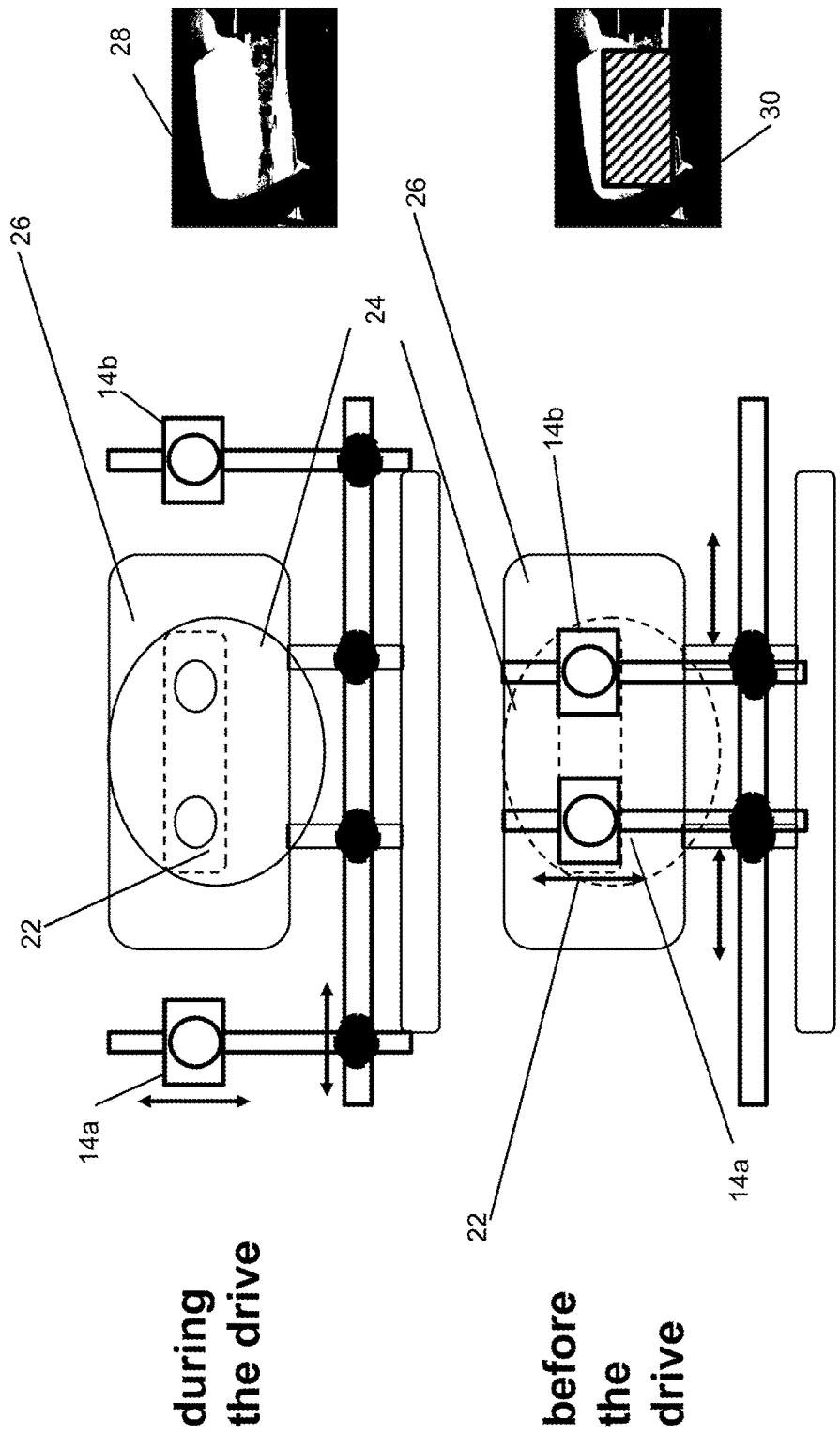

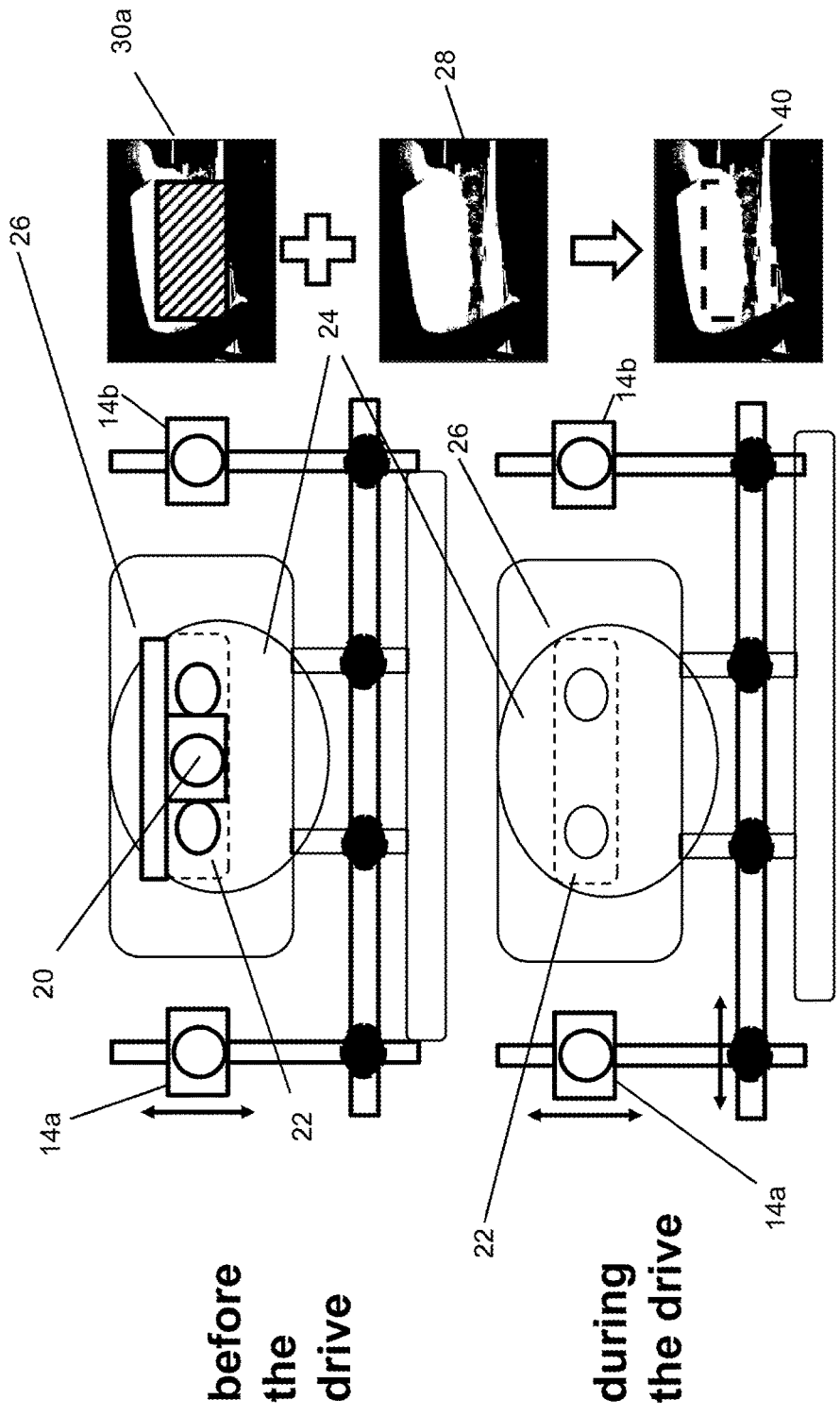

VIDEO IMAGE RECORDING METHOD AND REPRODUCING METHOD

CROSS-REFERENCE TO RELATED APPLICATION

This application claims priority to German Patent Application No. 10 2017 214 934.5 filed Aug. 25, 2017, the disclosure of which is hereby incorporated in its entirety by reference.

BACKGROUND OF THE INVENTION

1. Field of the Invention

The present invention relates to a video image recording method and to a data reproducing method. The present invention in particular relates to a video recording method for a vehicle, in particular a test vehicle in which data is recorded and captured for the optimization of a head-up display for a vehicle and a corresponding reproduction method for a test environment (test bench) for the optimization of the head-up display.

2. Related Art

Head-up displays are increasingly used in modern motor vehicles to supplement the reality visually recorded by the driver through the windshield with additional information (so-called "Augmented Reality", briefly AR, has established itself in technical terminology). For the sake of simplicity, the abbreviation AR is therefore also used in this description.

The additional AR information includes, for example, the display of traffic-relevant data such as road markings or traffic signs. In this respect, it is particularly important that the AR data projected onto the windshield by the optical system of the head-up display is displayed in the driver's field of view at the "correct" position, that is, where the corresponding information can be expected in the reality perceived by the driver or where an element of reality to which the additional information refers is located.

For this purpose, software algorithms are used in the control unit of the head-up display to control the mechanical-optical system of the head-up display accordingly. Since this is a relatively complicated problem, efforts are constantly being made to further improve and optimize the corresponding algorithms.

The present invention relates to an improved procedure for such an optimization of the algorithms of head-up displays.

Conventionally, it is possible to achieve optimization by means of a multitude of test drives of a test vehicle, whereby the software algorithm is changed (improved) after each series of test drives has been completed, and the result is evaluated in a subsequent series of test drives.

The present invention aims to eliminate the need for such a large number of test drives and instead provides a test environment in which data recorded during a test drive can be evaluated several times, even with modified (optimized) software versions.

This is of particular importance, since with newer developments, such as driver assistance systems and automatic driving, the required accuracy of position information for both the vehicle and the AR information in respect of the vehicle and the environment are constantly increasing. This includes, for example, symbols to be displayed for traffic-relevant content, such as pedestrian crossings or road boundaries, but also information on important points in the vehicle environment which should facilitate navigation, for example. While for AR data without reference to a fixed position, such as a speed limit on the road being driven on, a small error in positioning is still acceptable, this does not apply to position-related data.

Due to the resulting increasing complexity of the algorithms and the parameters and features to be processed, the test of the corresponding vehicle equipment on the road must now be supplemented by an evaluation in a test bench environment. For this purpose, video data recorded in the test vehicle relating to the vehicle environment and vehicle sensor data which form the basis of the additional AR information, must be able to be reproduced on the test bench.

A recording of the corresponding data, that is, a superimposition of a representation of the environment of the test vehicle with the additional AR data, in the test vehicle can be realized most easily by displaying the additional AR data on a navigation display of the vehicle ("Infotainment Unit"). For this purpose, it is sufficient to record the input data of the navigation display from the front camera of the vehicle and from the vehicle sensors and to evaluate them together on the test bench.

The situation is more complicated with a head-up display. Here, the vehicle environment is not recorded with a camera (thus, it is not available in electronically processed form), but corresponds to the visual perception of a real person (a driver).

For evaluation in the test environment, it is thus necessary to record such data that allow the combination of the visually perceived reality and the AR information displayed by the head-up display on the windshield by means of the corresponding algorithm in the test environment to reproduce the driver's perspective, thus, exactly as the driver actually perceives this in his field of view when looking at the windshield.

Thereby, it is particularly important to determine exactly where the AR information is in the forward-directed field of view of the driver, i.e., at which point of the field of view of the driver directed to the windshield, the AR information is faded in, and to simulate this accordingly on the test bench.

One possibility could first be to consider a method in which the combination of AR information and vehicle environment perceived by the driver when looking at the windshield is recorded by means of a camera worn by the driver using a headset. The viewing angle of such a camera is essentially the same as the driver's field of view and the video data it records thus reflects what the driver actually perceives.

However, this is disruptive for the driver and can lead to a changed and therefore unsuitable driving behavior for test purposes. In addition, short-term head movements of the driver that are difficult to control, for example, when changing lanes, lead to actually unwanted changes in the driver's perception which should not be taken into account during the test, if possible, because the head-up display should be intentionally adjusted to the perspective of the driver looking straight ahead.

Therefore, a stable camera position is advantageous for evaluation in the test environment.

Finally, recording a video of the real vehicle environment with the superimposed AR information has the further disadvantage that this video data is always recorded with a specific software, with the result that it is not possible to use it on the test bench again with modified software versions. Rather, the corresponding test drives would have to be repeated with each new software version.

Calibration systems for head-up displays have already been under development for some time and are described for example in documents U.S. Pat. No. 5,343,288, WO 2013/174501 A1, and US 2016/0377873 A1. However, this involves adapting the head-up display output to the focused field of view of the driver, and not recording a superimposition of the vehicle environment and faded-in AR information for test purposes.

It is also known, for example, in the field of flight simulators, to superimpose head-up display outputs on a video from the pilot's point of view. Such a simulator with a head-up display is described, for example, in document WO 01/67422 A2. However, in a flight simulator, video data can be used from the outset which was especially generated for the simulator and does not correspond to a real environment, for example, during a test flight so that the embedding of the additional head-up display data can occur here without direct reference to reality and a position-accurate reproduction in the middle of an image of reality is not essential. The main purpose of the flight simulator according to the document is to move the superimposition area according to the movement of a test person's head, for which the flight simulator is equipped with a head tracker.

SUMMARY OF THE INVENTION

The present invention aims to provide an improved recording method for the vehicle environment from the driver's perspective of a vehicle together with the AR information of a head-up display and a reproduction method for a test bench which allows the evaluation and optimization of the algorithms used by the head-up display, as well as a corresponding equipment for a vehicle and a corresponding test system.

This is achieved with the features of main claim 1 and further independent claims 6, 10, and 11.

According to a first aspect of the present invention, a video image recording method is provided. The video image recording method can be carried out with the vehicle equipment of a vehicle. The vehicle equipment includes a head-up display and at least two video cameras. The method comprises the step of determining camera positions of the two video cameras, outside the eyebox of the head-up display so that a stereoscopic superimposition of the video images recorded by the two video cameras produces a video of the vehicle environment according to a driver's field of view but without superimposing the output of the head-up display. The method further comprises the steps of determining a positioning of the output of the head-up display in the driver's field of view and recording information including this positioning, synchronized capturing and recording of video data streams from the determined camera positions and recording input data of the head-up display to determine the output of the head-up display in temporal synchronization with the video data streams.

According to a second aspect of the present invention, a reproducing method for data is provided, recorded with a method according to the first aspect of the invention. The reproducing method is carried out on a test system and comprises the steps of fusing the video data streams recorded by the two video cameras into a single video data stream corresponding to a video of the vehicle environment according to the driver's field of view, by stereoscopic superimposition, calculating an output of the head-up display on the basis of the input data recorded in temporal synchronization with the video data streams, synthesizing the fused video data stream with the calculated output of the head-up display according to the temporal synchronization based on the recorded information including positioning of the output of the head-up display in the driver's field of view and displaying the synthesized data stream on a display device of the test system or recording the synthesized data stream so that it can be reproduced on a display device.

In other words, according to the second aspect of the present invention, a reproduction method is indicated to be carried out on a test system in which video data streams recorded by two video cameras are processed for reproduction together with input data of a head-up display recorded in temporal synchronization with the video streams and based on recorded information which includes the positioning of the output of the head-up display in the field of view of a driver of a vehicle. The method comprises the steps of fusing the video data streams recorded by the two video cameras into a single video data stream corresponding to a video of the vehicle environment according to the driver's field of view, by stereoscopic superimposition, calculating an output of the head-up display based on the input data recorded in temporal synchronization with the video streams, synthesizing the fused video data stream with the calculated output of the head-up display according to the temporal synchronization, based on the recorded information including positioning the output of the head-up display in the driver's field of view, and displaying the synthesized data stream on a display device of the test system or recording the synthesized data stream so that it can be reproduced on a display device.

According to a third aspect of the present invention, equipment for a vehicle is provided. The equipment is adapted to carry out a method according to the first aspect of the invention. The equipment comprises at least two video cameras and a head-up display. The equipment further comprises a memory device for recording input data of the head-up display to determine the output of the head-up display in temporal synchronization with the video data streams captured by the video cameras and information including the positioning of the output of the head-up display in the driver's field of view.

According to a fourth aspect of the present invention, a test system is provided to carry out a reproducing method according to the second aspect of the invention. The test system comprises a memory device for storing video data streams captured by at least two video cameras in temporal synchronization with the recorded input data for determining the output of the head-up display of the vehicle and information including the positioning of the output of the head-up display in the driver's field of view. The test system further comprises a device for fusing the video data streams captured by the two video cameras into a single video data stream corresponding to a video of the vehicle environment according to the driver's field of view, by stereoscopic superimposition, a device for calculating an output of the head-up display on the basis of the input data recorded in temporal synchronization with the video data streams, and a device for synthesizing the fused video data stream with the calculated output of the head-up display according to the temporal synchronization, based on the recorded information which includes the positioning of the output of the head-up display in the driver's field of view. Finally, the test system comprises a display device for displaying the synthesized data stream or a recording device for capturing the synthesized data stream so that it can be displayed on a display device.

The specific approach of the present invention is to create a video of the vehicle environment in front of the vehicle from the driver's point of view and to record it temporally synchronized with correspondingly processed sensor data from vehicle sensors which form the basis for AR information to be displayed on the windshield by the head-up display. However, this occurs without capturing the AR information directly in a video and without having to influence the driver's view while driving, for example, by wearing a camera on the head. For this purpose, two video cameras are positioned outside the eyebox of the head-up display, that is, outside the area in which the output of the head-up display is clearly visible on the windshield. Subsequently, the positioning of the output of the head-up display is determined by means of a test image which comprises the maximum size of the output of the head-up display, by recording the vehicle environment including the superimposed test image of the head-up display from a temporary position of a camera in the area of the eyebox and recording it on a test system for further processing before the start of a test drive. The video streams generated by the two video cameras, the processed sensor data and information relating to the positioning of the output are transmitted to the test system. This allows a position-accurate superimposition of video data and AR data to be generated on a test bench. In particular, the superimposition on the test bench can be generated with different software versions without having to record new data with the test vehicle each time.

For this purpose, the vehicle sensors, the captured data of which are used to generate additional AR information, may be, for example, a speed sensor, a GPS sensor, and other sensors of a navigation system, cameras, or also a driving assistance system, in particular an ADAS system (Advanced Driving Assistance System). However, vehicle sensors for use in the scope of the present invention are not limited to this only exemplary list. Accordingly, additional information to be displayed by the head-up display, again without any claim to completeness, comprises, for example, guidance information such as arrows, road boundary lines, indications of obstacles in the route or destination information relating to a destination to be navigated to. In particular, the information is processed in such a way that it is displayed in symbolic form on the windshield.

Preferably, in the video image recording method according to the first aspect of the invention, the step of determining camera positions is carried out by positioning the cameras outside the eyebox at the height of the driver's eyes but offset outwards. To determine such a position, a test image of the head-up display is first output which includes the maximum size of the output of the head-up display and the driver selects its position and adjusts the head-up display so that he can capture the test image sharply and completely.

According to a preferred embodiment, the equipment of the vehicle comprises two video camera arrangements (arrays) each having a plurality of video cameras arranged one below the other, the images from all video cameras of the two arrangements being captured and recorded in parallel. This allows data to be captured from a variety of drivers of different heights and correspondingly different viewing angles during a test drive.

Preferably, the step of determining a positioning of the output of the head-up display in the driver's field of view is done by moving the video cameras inwards from the determined camera positions into the eyebox area before starting a test drive so that the video cameras can capture sharp and complete images of a test image output from the head-up display which comprises the maximum size of the output of the head-up display, within their field of view. In other words, the video cameras thus record, once and before the actual test drive begins, a superimposition of the front vehicle environment and additional AR information (in this case the test image). This image shows the position of the head-up display output in the field of view. Said capture is only possible before the test drive starts, since the driver has to leave his seat to allow the cameras to be moved into the area of his head (the eyebox).

Alternatively, the step of determining a positioning of the output of the head-up display is preferably carried out by the driver temporarily wearing a video camera on the head (in the area of the eyes, preferably centered) in his position, and the vehicle environment including the test image is recorded with this. The driver only has to wear the video camera temporarily before the test drive.

Preferably, in the reproducing method according to the second aspect of the invention, in the step of calculating the output of the head-up display from the recorded input data, the output is calculated without any distortion required for the display on a curved projection surface (windshield) in the vehicle so that its presentation on a conventional flat projection surface is possible. In other words, it is not necessary here to implement all the hardware of a vehicle on the test bench, and the output is calculated by means of software, for presentation on a normal display, as a pure simulation.

Further preferably in this case, the entire algorithm, is carried out first when calculating the output of the head-up display, as in the control unit of the head-up display in the vehicle, thus including the distortion required there, and the distortion is then reversed again.

Alternatively, a test system is preferably used in which the complete hardware of a vehicle head-up display (including a control unit and the optical/mechanical components) is implemented, as well as a corresponding projection surface (in the form of the windshield) and a camera (video camera) are available. In the synthesizing step, the output of the head-up display to be synthesized with the fused video stream is displayed on the projection surface and recorded with the camera. The recorded data stream is then synthesized with the fused video data stream.

Further features and advantages of the present invention are the subject matter of dependent claims.

BRIEF DESCRIPTION OF THE DRAWINGS

Additional features and advantages of the present invention are explained below in the detailed description and shown in the attached drawings, wherein:

FIG. 3 explains a solution to the problem described in FIG. 2a according to an embodiment of the present invention;

FIG. 4 explains an alternative solution to the problem described in FIG. 2a according to an alternative embodiment of the present invention;

Figure 1:
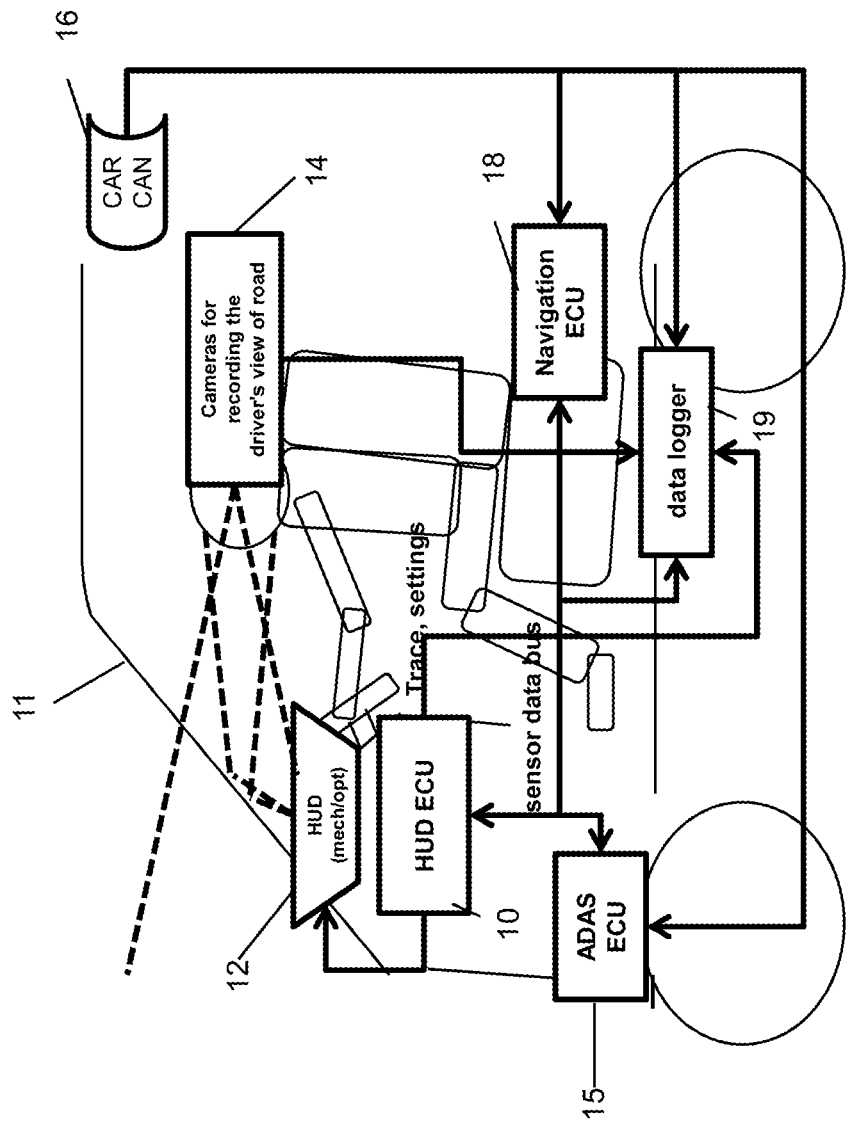
FIG. 1 provides an overview of the equipment of a vehicle according to an embodiment of the present invention.

In the different Figures, identical reference signs indicate identical or corresponding features so that a repeated description is dispensed with as the case may be.

DETAILED DESCRIPTION

The present invention relates to the testing and optimizing of software for a head-up display for fading in additional AR information on the windshield of a vehicle, by using a test bench. The invention aims to capture a video from a driver's forward-directed viewing angle as well as processed vehicle sensor data in such a way that a position-accurate superimposition of a video image of the vehicle environment with the output of the head-up display on the test bench is possible. This can significantly reduce the development time because data recorded during a test drive can be reproduced as often as necessary with different parameters or software versions. The present invention thereby enables to carry out the evaluation of the test bench both in an HIL solution (hardware-in-the-loop, implementation of the complete hardware solution of the head-up display of the vehicle on the test bench) and in an SIL solution (system-in-the-loop, in which the entire reproduction is implemented on the test bench with software).

The apparently easiest solution, namely to simply record a video of the superimposition of the front environment of the vehicle with the additional AR data displayed on the windshield during a test drive with a camera mounted on the head, fails already because a camera can hardly be realized during the drive in the driver's head area (disruptive influence, driver's head movement). On the other hand, the area in which the output of the head-up display is sharp and completely visible, the so-called eyebox, is a relatively small area in the direct eye area of the driver according to the respective setting of the head-up display, as can be seen for example in FIG. 2a. Thus, if the vehicle environment has to be recorded with video cameras outside the direct eye area of the driver, these video cameras cannot simultaneously also record the superimposed AR additional information. Therefore, according to the invention, these are recorded separately, that is, the input data of the control unit of the head-up display are recorded temporally synchronized with the recorded video data. These input data are used to evaluate the output of the head-up display in the control unit of the head-up display by means of a software algorithm. On the basis of the data collected, this evaluation can be repeated on the test bench.

In addition, a common video recording of the vehicle environment and additional AR information in the vehicle has the fundamental disadvantage that this always is done with a specified software version, which does not allow any changes to optimize the software on the test bench.

Since a centrally symmetrical arrangement of a camera according to the driver's viewing angle (due to the presence of the driver during the test drive) is not possible, two cameras are used according to the invention. These are arranged right-left-symmetrically to the driver's head so that the stereoscopic superimposition of the video data streams captured by these two video cameras results in an image according to the driver's viewing angle, however, without containing the additional AR information, since the camera positions are located outside the eyebox.

For later temporally synchronized reproduction, the data bus traffic of the vehicle bus used for feeding sensor data to the control unit of the head-up display, the output of the cameras recording the front environment of the vehicle (in a way that allows later reproduction with different software), and a tracer output of the head-up display software (including settings of the head-up display hardware, in particular the optical/mechanical system) are recorded temporally synchronized via a central storage unit (data logger). Temporal synchronization preferably occurs by adding time stamps.

The present invention thus records both video data of a forward-directed field of view of a driver of a vehicle, in particular of a test vehicle, and sensor data of vehicle sensors which form the basis for the generation of additional AR information, in temporal synchronization with each other.

FIG. 1 shows an overview of the vehicle equipment of a vehicle, in particular of a test vehicle according to an embodiment of the present invention.

The equipment comprises a head-up display (HUD), including an electronic control unit (HUD ECU) 10 and a mechanical/optical imaging system 12 for displaying an output of the head-up display on the windshield 11 of the vehicle. The vehicle equipment further comprises two video cameras 14 which are arranged right and left of the driver's position according to the invention in order to enable a video image recording according to a driver's viewing angle by stereoscopic superimposition. Furthermore, the vehicle equipment has sensors as well as devices for processing raw data from the sensors (shown here exemplarily an ADAS control unit 15 and a control unit of a navigation system 18), a vehicle bus (CAR CAN 16) which in particular also serves to feed sensor data to the control unit 20 of the head-up display, as well as a data logger 19.

Figure 2A:
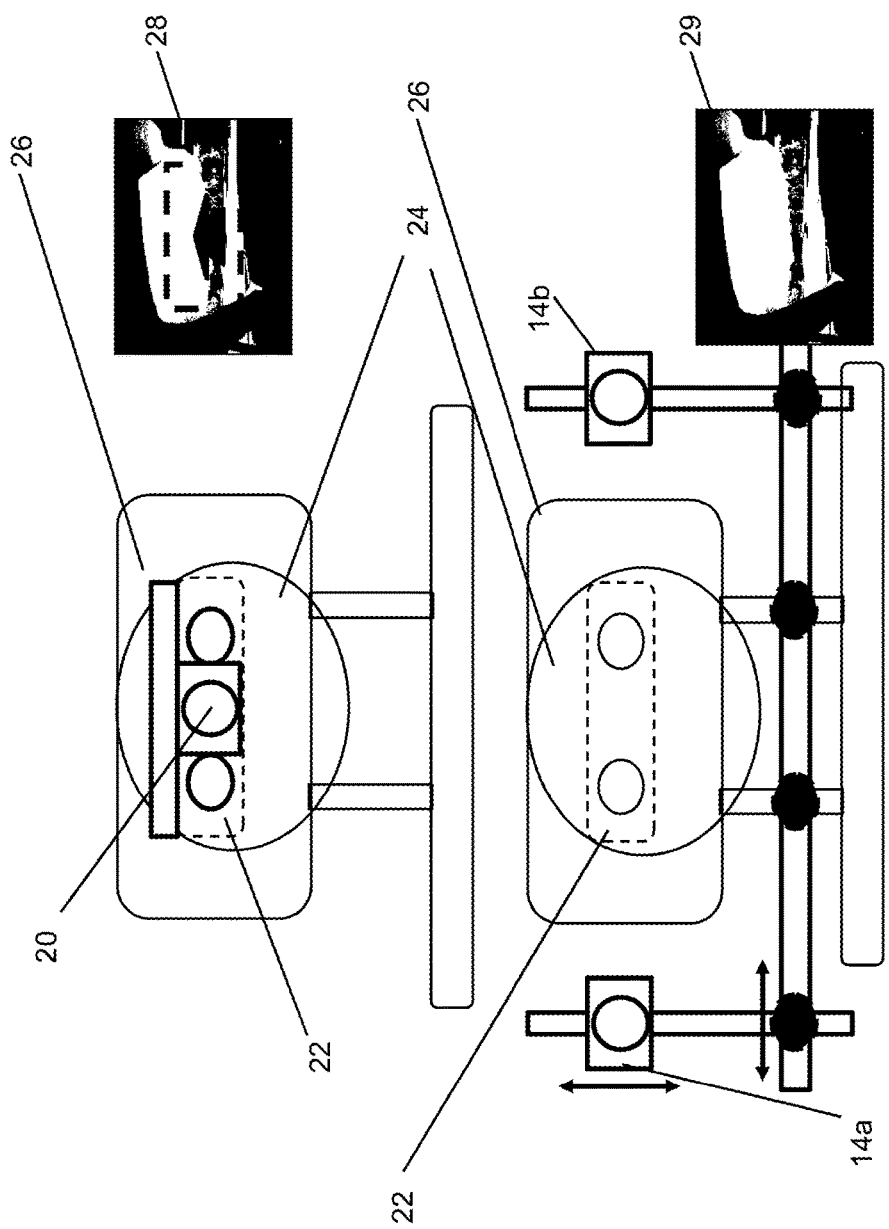
FIG. 2a explains a problem underlying the invention.

FIG. 2a explains a problem which results from the fact that the camera cannot be attached directly to the driver's head during the test drive.

As explained above, the easiest way to obtain electronic data of a superimposition of an image of the front of the vehicle environment from the driver's viewing angle, superimposed with the additional AR information shown on the head-up display, is to equip the driver with a camera.

Such a situation is shown in the illustration of FIG. 2a above. The driver wears a camera 20 on his head 24, for example, via a headband or integrated in sunglasses. Furthermore, the illustration shows the headrest 26 and the eyebox 22, that is, the area in which the image from the head-up display is sharply visible. An exemplary output 28 of a camera 20 arranged in this way is shown in the upper right corner of the Figure. The output shows the view from the vehicle forward from the driver's position, superimposed with an output of the head-up display (black arrow and dashed boundary line representing the maximum size of the output of the head-up display).

As already explained above, however, wearing a camera 20 by the driver during driving is not suitable for the purposes of the present invention.

In the context of the present invention, the camera 20 attached to the driver's head 24 is therefore replaced by a right-left-symmetrical arrangement of two video cameras 14a and 14b which are arranged at eye-height and thus outside the direct head area and also outside the eyebox 22. Such an arrangement is shown in the lower illustration of FIG. 2a. According to the preferred embodiments shown, the two video cameras 14a and 14b are each attached to a mounting arrangement (holder) of the headrest 26, adjustable in height and lateral position. However, since the eyebox 22 covers only a small area (as can be seen from the size comparison with the headrest 26), the cameras arranged in this way are outside the eyebox 22. Accordingly, the cameras cannot record the superimposed additional AR information in this position. This is shown in the lower right corner of the Figure. The exemplary representation there shows a stereoscopic superimposition of the outputs of the two video cameras 14a and 14b in the arrangement shown. The stereoscopic superimposition of the two images thus shows an image of the road in front of the vehicle from the same viewing angle as the driver, whose head 24 is located between the two cameras 14a and 14b.

Figure 2B:
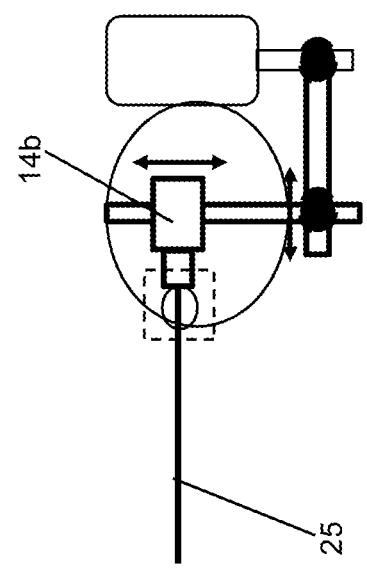
FIG. 2b shows a side view of a camera arrangement in the vehicle according to an embodiment of the present invention.

FIG. 2b shows a side view from the left of the arrangement in the lower illustration of FIG. 2a. Here, only one camera 14b is visible (the second camera 14a is covered). As can further be seen from the Figure, the visual axis of the camera and thus the field of view 25 is directed straight ahead.

A synopsis of FIGS. 2a and 2b additionally shows that the cameras are arranged movably along three axes according to the embodiment shown. In particular, movement in vertical direction is possible, as well as movements in the horizontal plane forwards/backwards (in the direction of the vehicle longitudinal axis) and right/left (transversely to the vehicle longitudinal axis). According to the preferred embodiment, a synchronous position change of the two cameras can be made by means of stepper motors in each of the directions mentioned.

FIG. 3 serves to explain the determination of the position of the output of the head-up display according to an embodiment of the present invention.

The upper illustration in FIG. 3 corresponds to the lower illustration in FIG. 2a. In particular, the cameras 14a and 14b are arranged at eye height, but shifted outwards in relation to the eyebox 22. Accordingly, a fusion of the video images recorded by the two cameras results in the recording 28 shown in the upper right corner, without visible superimposition of the output content of the head-up display.

The lower illustration shows a situation in which the two cameras 14a and 14b have been moved inwards into the eyebox 22 (thus, approximately coincide with the position of the driver's eyes). Of course, such a position can only be occupied temporarily by the cameras, if the driver's seat is unoccupied during calibration. The stereoscopic superimposition 30 of the images captured by the two cameras in this position is shown in the lower right corner of the Figure. It shows a superimposition of the image 28 (without output contents of the head-up display) with an output of the head-up display (in this case a test image, represented as a hatched rectangle corresponding to the maximum size of the output of the head-up display).

The procedure according to the embodiment of the present invention is as follows:

First, the head-up display is prompted to output a test image covering the maximum size of an output of the head-up display. The driver gets in and adjusts the head-up display according to his height and position so that he can clearly see the test image. At the same time, the cameras are adjusted by appropriate movements in such a way that they assume camera positions which are located vertically and horizontally at eye height in the longitudinal direction so that in particular also the visual axis of the cameras is parallel to that of the driver's eyes, but the cameras are shifted to the right and left sufficiently far outwards so that they are not disruptive to the driver, whereby they are located outside the eyebox 22, as shown in the upper area of FIG. 3. As indicated in the image, this is approximately in the area of the driver's shoulders. This camera position setting is the camera position determined for the test drive. It is therefore recorded.

The cameras 14a and 14b are then moved backwards so that the driver can get out. After this, the cameras 14a and 14b are moved back again to the previously stored position. Subsequently, the cameras 14a and 14b are moved inwards until they reach the area of the eyebox 22 as shown in the lower area of FIG. 3. In this position, the cameras take sharp images of the test image superimposed on the front of the vehicle environment, the stereoscopic superimposition of which can be seen in the illustration 30. The corresponding images are recorded and contain as key information ("reference data") the positioning of the output of the head-up display in the middle of the driver's field of view.

The cameras 14a and 14b are then moved outwards and backwards again so that the driver can get back in. Afterwards, the cameras 14a and 14b are moved forward again to the height of the driver's eyes, that is, to the previously determined and stored camera position. Now the test image is switched off and the actual additional AR information is output on the basis of the bus traffic of the vehicle bus. The entire content is recorded (logged) synchronously using time stamps.

FIG. 4 is a representation of an alternative procedure for determining the positioning of the output of the head-up display in the middle of the driver's field of view, thus, corresponding to the section of the vehicle environment recorded by the two video cameras 14a and 14b.

The camera positions to be used during the test drive correspond to those described in the embodiment described above in connection with FIG. 3. They are shown again in the lower section of FIG. 4 and a repetition of the detailed description is omitted.

The upper area of FIG. 4 shows the determination of the position of the output of the head-up display in the driver's field of view which is carried out here in an alternative way, without the need for a horizontal transverse displacement of the cameras inwards and without the need for the driver to get out of the vehicle again. For this purpose, a camera 20 is temporarily attached to the driver's head, as already shown in FIG. 2a. This camera 20 is preferably placed centered so that a stereoscopic superimposition of the images recorded by two cameras can be omitted.

An illustration of the respectively recorded images can be seen in the right area of FIG. 4. The upper illustration 30a thereby shows the image captured by camera 20 on the driver's headband. It shows the positioning of the test image in the driver's field of view. The middle illustration 28 corresponds to a stereoscopic superimposition of the images taken by the cameras 14a and 14b in the lower drawing. It does not show any output from the head-up display. The information from the image 30a captured via the driver camera with the HUD test image allows to determine the area within the fused video data stream where the output of the HUD ECU (overlay) must be placed later on the test bench during reproduction, as indicated in the lower illustration 40.

Figure 5:
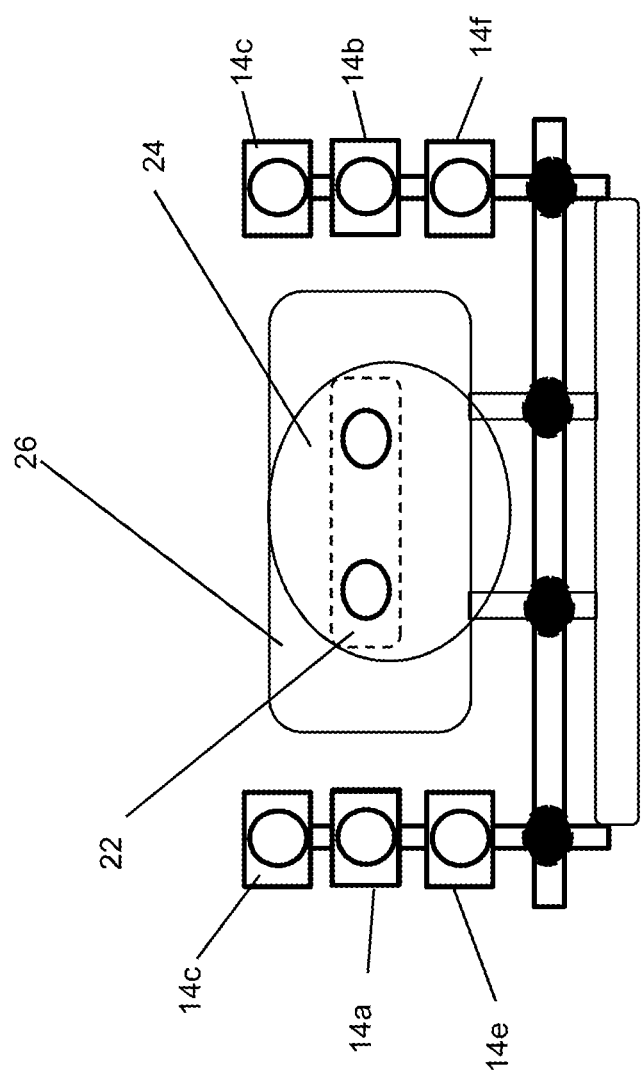
FIG. 5 shows an array of video cameras in the vehicle according to an embodiment of the present invention.

Another variant of the vehicle's camera equipment is shown in FIG. 5.

For this purpose, an array of several cameras (14a-f) is provided on both sides of the driver's head instead of the pair of cameras 14a and 14b to be positioned outside the eyebox 22 on the right and left of the driver's eyes. In the example shown, there are three cameras arranged specifically on both sides, one below the other each. However, this number is only exemplary and serves as an illustration. In the context of the invention, any suitable number of cameras arranged one below the other may be provided on both sides.

The respective camera arrangements include the two cameras 14a and 14b which are at the driver's eye height and can be used to calibrate the arrangement as described above.

The purpose of using the shown camera arrangement is to collect and record parallel data for a plurality of possible positions of the driver's head 24 (corresponding to several viewing angles). Thus, a simulation for several drivers of different heights can be carried out later on the test bench with the result of a single test drive or a series of test drives.

Multiple calibration is not required. If this is carried out for one driver so that the two cameras 14a and 14b are at his eye height (and thus at the height of the eyebox 22 of the head-up display correctly set for this driver), the correct positioning of the output of the head-up display for drivers of other heights (the eyes of whom would be located in the area of other camera pairs of the arrangement) can be calculated on the basis of the known distances of the cameras arranged below each other.

In the following, the equipment of exemplary embodiments of a test system (test bench) and the method carried out there are described by means of the drawings in FIG. 6 and FIG. 7.

Figure 6:
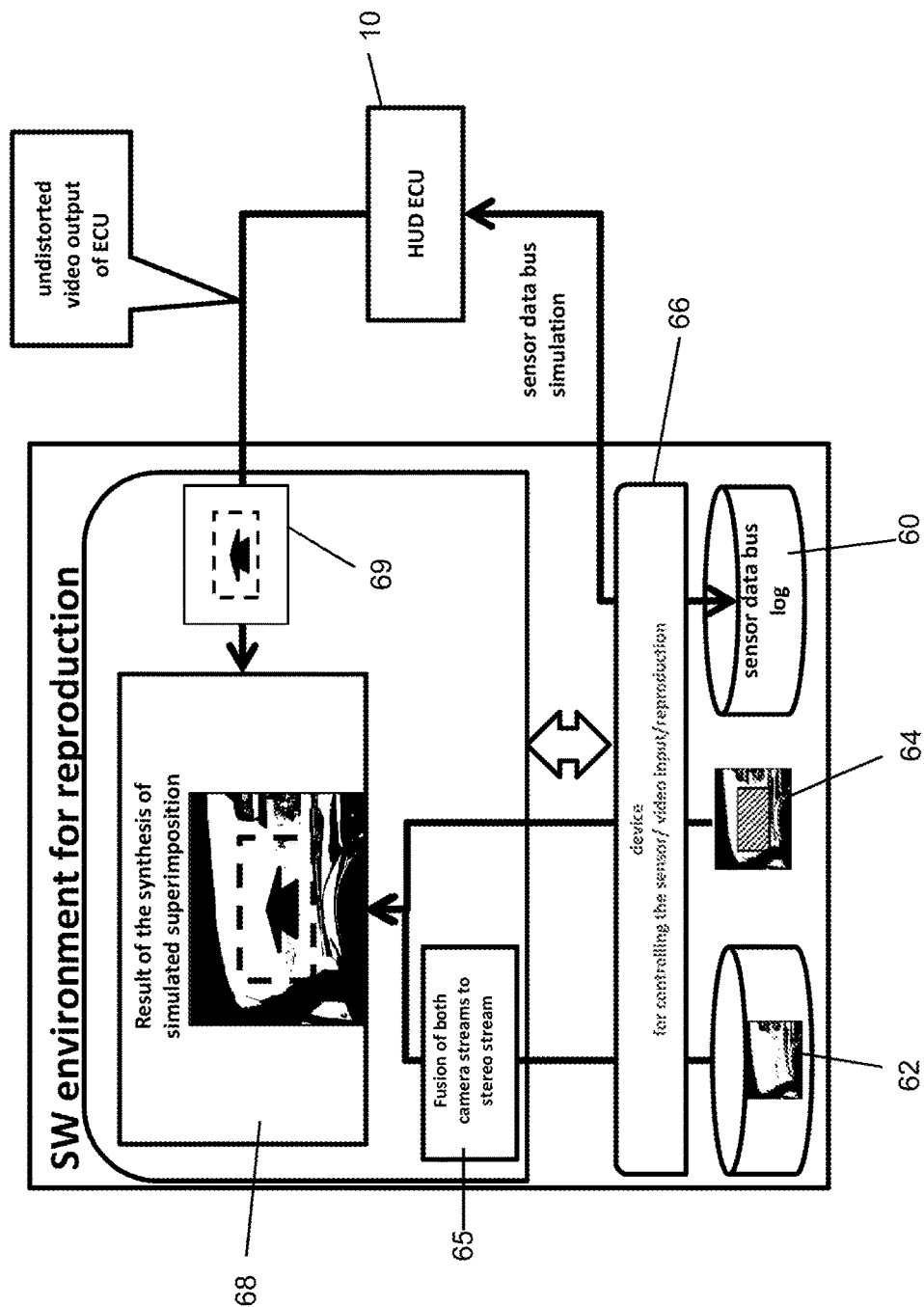
FIG. 6 provides an overview of a test system (test bench) according to an embodiment of the invention.

A basic configuration of a test system (test bench) for evaluating the data recorded in the test vehicle is shown in FIG. 6.

This has a memory device for the data recorded in the vehicle, that is, the processed vehicle sensor data 60 from the vehicle bus which serve as input data for the head-up display in the vehicle, the two video data streams 62 from the cameras 14a and 14b, as well as the information 64 which indicates the positioning of the output of the head-up display in the driver's field of view. The test system further comprises a device 66 for controlling the reproduction of the recorded data and a device 65 for fusing the two individual video data streams from the individual cameras 14a and 14b into a single video data stream, by stereoscopic superimposition. In addition, a device is available for calculating the output of the head-up display on the basis of the recorded input data 60 from the vehicle bus system. In principle, a computer equipped with a corresponding software algorithm can be used for this. In particular, as shown in the Figure, this can be a head-up display control unit 10 corresponding to the head-up display control unit 10 used for recording. In particular, it is possible to remove the control unit 10 from the test vehicle and transfer it to the test bench. This ensures that not only the same software can be used (exactly the same algorithm runs), but also that the hardware is identical. Since the head-up display control unit is supplied with power from the vehicle when used in the test vehicle, an appropriate power supply must be provided in this case.

The procedure for the reproduction of the sensor bus data and their synthesis with the video data on the test bench is as follows.

When the recording in the test vehicle is completed, the recorded data is downloaded from the data logger 19 into the test environment.

In preparation for reproduction, the two video streams recorded by the cameras 14a and 14b are fused into a single central image, similar to the driver's field of view, by the corresponding device 65.

The use of the recorded sensor bus data and the HUD tracer output with the head-up display settings triggers the generation of the output 69 of the head-up display to be superimposed on the video image by the corresponding device, in particular the head-up display control unit 10. In principle, the HUD software used may differ from that used during recording. The output 69 of the head-up display control unit 10 is recorded by a video recording device. For this purpose, the distortion of the output required in the vehicle for a display on the curved projection surface 11 (windshield) is not applied in the software algorithm. This can be done either by omitting the corresponding processing or by recalculating to an undistorted output 69 after complete application of the software algorithm, including the distortion. Therefore, it is not necessary to provide a curved projection surface corresponding to the windshield 11 of the test vehicle on the test bench.

Next, information 64, where the HUD output field is positioned within the forward-directed field of view, is used to synthesize the generated output 69 of the head-up display with the fused video stream so that an image of the vehicle environment with the superimposed additional AR information similar to the driver's perception in the test vehicle is generated. This is shown in image 68 of FIG. 6 (with a black arrow as an example of additional AR information; similar to image 40 in FIG. 4, where only the maximum limit of the output field is indicated by a dashed black line). This allows the development of features of the head-up display, in particular changes to the software algorithm on the test bench without the need for new test drives, as long as the format for the transmission of sensor data in the vehicle bus is not changed.

Figure 7:
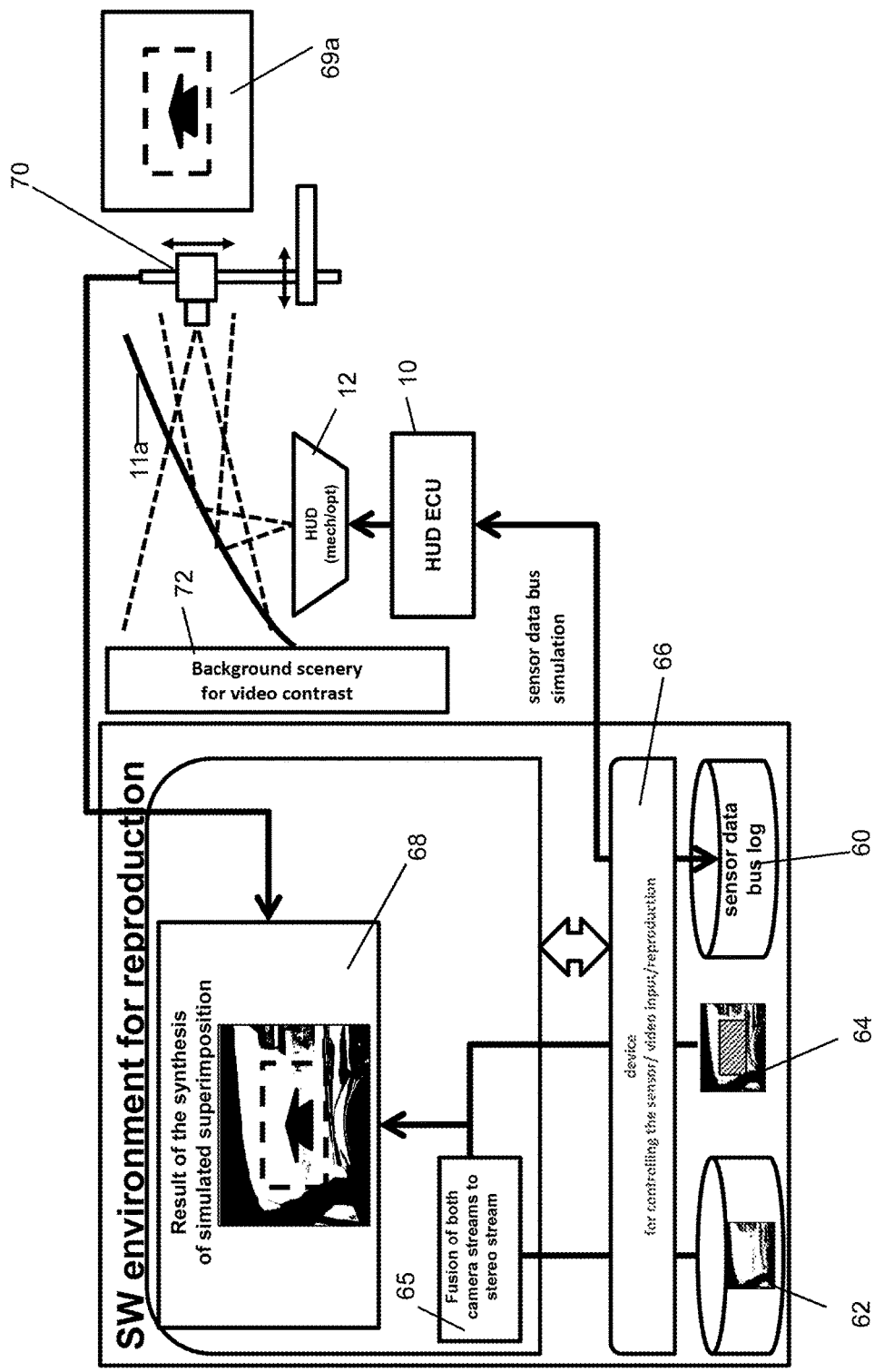
FIG. 7 provides an overview of a test system (test bench) according to another embodiment of the invention.

An alternative embodiment of a test bench equipment is shown in FIG. 7.

The complete hardware of the head-up display, including the control unit 10 and the mechanical/optical components 12 is hereby implemented on the test bench (or transmitted to it). Furthermore, a curved projection surface 11a with the curvature corresponding to the windshield of the test vehicle is implemented. The head-up display output calculated from the recorded input data 60 as in the vehicle is projected onto the curved projection surface 11a and captured by a corresponding video camera 70. The background scenery 72 is provided to improve the contrast.

The other elements shown in FIG. 7 and their functionality correspond to those of FIG. 6 so that a new description can be dispensed with at this point. In particular, the image 69a recorded by the video camera 70 is now synthesized with the fused video stream and a result is produced in the form of the image 68, similar to FIG. 6. When using a structure according to FIG. 7, the use of a curved projection surface 11a means that the software settings of the control unit 10 of the head-up display do not need to be changed in such a way that the distortion is not executed or recalculated.

In summary, the present invention relates to a method for optimizing a head-up display for the output of positionally-accurate additional AR information by means of a test vehicle and a test system (test environment or test bench). For this purpose, in the test vehicle, the input data of the head-up display output by the vehicle bus for generating additional AR information and video data containing a view of the road (vehicle environment), as perceived by the driver, are recorded separately but temporally synchronized. Furthermore, information is generated that indicates a position where the output of the head-up display, that is, the additional AR information, is arranged in the driver's field of view. The recorded data is used for a corresponding reproduction in the test environment. This allows the head-up display software to be further developed without having to carry out test drives with the test vehicle every time the software is changed. This is particularly the case due to the fact that not the output of the head-up display already processed by the head-up display software of the test vehicle on the windshield is recorded, but the input data of the head-up display, thus, prepared vehicle sensor data, as they are made available to the head-up display in the test vehicle via the vehicle bus.

The invention claimed is:

1. A video image recording method that can be carried out with vehicle equipment of a vehicle, the vehicle equipment comprising a head-up display and at least two video cameras, and the method comprising the steps of:
   determining camera positions of said two video cameras outside the eyebox of the head-up display so that a stereoscopic superimposition of the video images recorded by said two video cameras produces a video of the vehicle environment according to the field of view of a driver but without superimposing the output of the head-up display,
   determining a positioning of the output of the head-up display in the driver's field of view and recording information that includes this positioning,
   synchronized capturing and recording of video data streams from the determined camera positions, and
   recording input data from the head-up display to determine the output of the head-up display in temporal synchronization with the video data streams.

2. The method according to claim 1, wherein
   the two video cameras being arranged in the region of the headrest of the driver's seat of the vehicle in the three dimensions vertically, horizontally in transverse direction to the longitudinal axis of the vehicle and forwards/backwards parallel to the longitudinal axis of the vehicle coordinately movable with one another, with a field of view directed forwards from the vehicle and the step of determining camera positions comprising the steps of:
   outputting a test image of the head-up display, which comprises the maximum size of the output of the head-up display,
   positioning a driver and adjusting the head-up display so that the driver can capture the test image sharply and completely, and
   moving the two cameras to positions offset from the positions of the driver's eyes outwards to outside the eyebox.

3. The method according to claim 1, wherein
   the equipment of the vehicle comprises two video camera arrangements each having a plurality of video cameras arranged one below the other, including the at least two video cameras, and
   the step of synchronized capturing and recording captures and records the images from all video cameras of the two arrangements in parallel.

4. The method according to claim 1, wherein said two video cameras in the area of the headrest of the driver's seat of the vehicle are arranged so as to be at least horizontally in a transverse direction to the longitudinal axis inwardly coordinated movable out of the determined camera positions and the step of determining a positioning of the output of the head-up display in the driver's field of view comprising the steps of:
   moving the video cameras from the determined camera positions inwardly into the area of the eyebox so that the video cameras can capture sharp and complete images of a test image output from the head-up display, which comprises the maximum size of the output of the head-up display, within their field of view,
   capturing and recording the images as the information including the positioning of the output of the head-up display in the driver's field of view, and
   moving the video cameras back to the determined camera positions.

5. The method according to claim 1, wherein the step of determining a positioning of the output of the head-up display in the driver's field of view comprises the steps of:
   temporarily arranging a video camera in the area of the driver's eyes so that it can capture a sharp and complete image of a test image output from the head-up display, which comprises the maximum size of the output of the head-up display, within the field of view, and
   capturing and recording such an image as the information including the positioning of the output of the head-up display in the driver's field of view.

6. A reproducing method for data recorded with a method according to claim 1 to be carried out on a test system, the reproducing method comprising the steps of:
   fusing the video streams recorded by said two video cameras into a single video stream corresponding to a video of the vehicle environment corresponding to the driver's field of view, by stereoscopic superimposition,
   calculating an output of the head-up display based on the input data recorded in temporal synchronization with the video data streams;
   synthesizing the fused video data stream with the calculated output of the head-up display according to the temporal synchronization, based on the recorded information, which includes positioning of the output of the head-up display in the driver's field of view, and
   displaying the synthesized data stream on a display device of the test system or recording the synthesized data stream so that it can be displayed on a display device.

7. The reproducing method according to claim 6, wherein the step of calculating the output of the head-up display from the recorded input data calculates the output without distortion required for the display on a curved projection surface in the vehicle so that a display on a conventional planar projection surface is possible.

8. The reproducing method according to claim 7, wherein the step of calculating the output of the head-up display first calculates the output as in the vehicle with distortion for the display on a curved projection surface and then reverses the distortion.

9. The reproducing method according to claim 6, wherein
   the test system comprises a complete head-up display corresponding to the head-up display used for recording, as well as a corresponding projection surface and a camera,
   wherein in the step of synthesizing the output of the head-up display to be synthesized with the fused video data stream is displayed on the projection surface and recorded with the camera and the recorded data stream is subsequently synthesized with the fused video data stream.

10. A test system for carrying out a reproducing method according to claim 6, comprising:
   a memory device for storing video data streams captured by at least two video cameras in temporal synchronization with the recorded input data for determining the output of the head-up display of the vehicle and information including positioning the output of the head-up display in the driver's field of view,
   a device for fusing the video data streams captured by said two video cameras into a single video data stream corresponding to a video of the vehicle environment according to the driver's field of view, by stereoscopic superimposition,
   a device for calculating an output of the head-up display based on the input data recorded in temporal synchronization with the video data streams;

a device for synthesizing the fused video data stream with the evaluated output of the head-up display according to the temporal synchronization, based on the recorded information, which includes positioning the output of the head-up display in the driver's field of view, a display device for displaying the synthesized data stream or a recording device for recording the synthesized data stream so that it can be reproduced on a display device.

11. The test system according to claim 10 comprising a complete head-up display corresponding to the head-up display used for recording, and a corresponding projection surface and a camera, wherein the output of the head-up display to be synthesized with the fused video data stream is displayed on the projection surface and recorded with the camera and the recorded data stream is subsequently synthesized with the fused video stream.

12. Equipment for a vehicle adapted to carry out a method according to claim 1, comprising:

at least two video cameras, a head-up display, and a memory device for recording input data of the head-up display for determining the output of the head-up display in temporal synchronization with the video data streams captured by the video cameras, as well as information including the positioning of the output of the head-up display in the driver's field of view.

* * * * *